(12) United States Patent
Furbish et al.

(10) Patent No.: US 10,417,679 B1
(45) Date of Patent: Sep. 17, 2019

(54) TRANSACTION VALIDATION SCORING

(71) Applicants: Kevin Michael Furbish, Tampa, FL (US); Calum Murray, Mountain View, CA (US); John J. Tumminaro, Mountain View, CA (US); Jeffrey A. Langston, Mountain View, CA (US)

(72) Inventors: Kevin Michael Furbish, Tampa, FL (US); Calum Murray, Mountain View, CA (US); John J. Tumminaro, Mountain View, CA (US); Jeffrey A. Langston, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 827 days.

(21) Appl. No.: 14/529,962

(22) Filed: Oct. 31, 2014

Related U.S. Application Data

(63) Continuation-in-part of application No. 13/911,890, filed on Jun. 6, 2013.

(51) Int. Cl.
*G06Q 30/06* (2012.01)

(52) U.S. Cl.
CPC ..... *G06Q 30/0609* (2013.01); *G06Q 30/0631* (2013.01)

(58) Field of Classification Search
CPC .............. G06Q 30/0609; G06Q 20/40; G06Q 30/0201; G06Q 30/0631; G06F 16/285; G06F 16/9535
See application file for complete search history.

(56) References Cited

U.S. PATENT DOCUMENTS

| | | | | |
|---|---|---|---|---|
| 4,623,885 A * | 11/1986 | Bladh | ................... | H04L 12/433 370/452 |
| 6,871,181 B2 * | 3/2005 | Kansal | ............... | G06Q 10/0639 705/26.25 |
| 8,100,322 B1 * | 1/2012 | Nachenburg | ........... | G06Q 30/02 235/376 |
| 8,266,013 B2 * | 9/2012 | Kennedy | ............ | G06Q 30/0601 705/26.1 |
| 8,380,709 B1 * | 2/2013 | Diller | .................. | G06F 17/3053 707/723 |

(Continued)

FOREIGN PATENT DOCUMENTS

KR     1020040002030 A     1/2004

*Primary Examiner* — Florian M Zeender
*Assistant Examiner* — Milena Racic
(74) *Attorney, Agent, or Firm* — Ferguson Braswell Fraser Kubasta PC

(57) ABSTRACT

A method for transaction verification scoring includes obtaining, from a distributed computing system of distributed computing systems distributed throughout a computing network, a transaction description describing a financial transaction with a vendor, obtaining, from the distributed computing systems, transaction records of potential corroborators, and reconciling, with the financial transaction, the transaction records to obtain at least one matching transaction record of at least one corroborator, in the potential corroborators, to the financial transaction. The method further includes scoring the transaction description based on a function of each of the at least one corroborator to the financial transaction to obtain a verification score, and presenting, on a display device, a recommendation of the vendor to a consumer based on the verification score.

20 Claims, 10 Drawing Sheets

(56) References Cited

U.S. PATENT DOCUMENTS

| | | | | |
|---|---|---|---|---|
| 8,762,268 B2* | 6/2014 | Wall | ............... | G06Q 20/383 |
| | | | | 705/39 |
| 2003/0196087 A1* | 10/2003 | Stringer | ............ | G06F 21/6209 |
| | | | | 713/171 |
| 2005/0125360 A1* | 6/2005 | Tidwell | ............. | G06Q 20/042 |
| | | | | 705/65 |
| 2005/0138160 A1 | 6/2005 | Klein et al. | | |
| 2007/0078670 A1* | 4/2007 | Dave | ............... | G06F 17/274 |
| | | | | 705/347 |
| 2008/0140442 A1* | 6/2008 | Warner | ............ | G06Q 20/10 |
| | | | | 705/26.41 |
| 2008/0235513 A1 | 9/2008 | Foster et al. | | |
| 2008/0262920 A1 | 10/2008 | O'Neill et al. | | |
| 2008/0294501 A1* | 11/2008 | Rennich | ............ | G06Q 30/02 |
| | | | | 705/7.29 |
| 2009/0055907 A1 | 2/2009 | Van Horn | | |
| 2010/0329267 A1* | 12/2010 | Sakamoto | ............ | H04L 12/42 |
| | | | | 370/400 |
| 2011/0082781 A1* | 4/2011 | Hu | ............... | G06N 5/022 |
| | | | | 705/35 |
| 2011/0251888 A1 | 10/2011 | Faith et al. | | |
| 2012/0042040 A1 | 2/2012 | Bailey et al. | | |
| 2012/0047298 A1* | 2/2012 | Inoue | ............... | G06F 13/4256 |
| | | | | 710/107 |
| 2012/0203708 A1* | 8/2012 | Psota | ............... | G06Q 30/02 |
| | | | | 705/347 |
| 2012/0310831 A1* | 12/2012 | Harris | ............. | G06Q 30/02 |
| | | | | 705/44 |

* cited by examiner

FIG. 4

400 Example Chart

| Vendor | Vendor Financial Institution | Customer Financial Institution | Customer | Verification Score |
|---|---|---|---|---|
| YES | NO | NO | NO | 5 |
| YES | NO | NO | YES | 25 |
| YES | NO | YES | NO | 45 |
| YES | NO | YES | YES | 75 |
| YES | YES | NO | NO | 45 |
| YES | YES | NO | YES | 80 |
| YES | YES | YES | NO | 80 |
| YES | YES | YES | YES | 100 |

402  404  406  408  410

TRANSACTION VALIDATION SCORING

CROSS-REFERENCE TO RELATED APPLICATIONS

This application is a continuation in part application of and, thereby, claims benefit under 35 U.S.C. § 120 to co-pending U.S. application Ser. No. 13/911,890, filed on Jun. 6, 2013, and entitled, "USING COMMERCE NETWORKS TO FACILITATE BUSINESS INTERACTIONS AMONG ENTITIES." U.S. application Ser. No. 13/911,890 is incorporated herein by reference.

BACKGROUND

Computer networks provide a mechanism for individuals who do not know each other to communicate. One type of communication is to provide data and received ratings for vendors. In some instances, the communication is relatively anonymous. In other words, while a user may provide a user name, that username may not be a known identification of the user, such as a real name. Moreover, the anonymity may be result from not knowing the individual user and whether that individual user has a relationship with the vendor. Because of the anonymity, with respect to the data and ratings, a consumer determining whether to use a particular vendor may not be able to tell whether the ratings and recommendations received online are sincere.

SUMMARY

In general, in one aspect, embodiments relate to a method for transaction verification scoring including obtaining, from a distributed computing system of distributed computing systems distributed throughout a computing network, a transaction description describing a financial transaction with a vendor, obtaining, from the distributed computing systems, transaction records of potential corroborators, and reconciling, with the financial transaction, the transaction records to obtain at least one matching transaction record of at least one corroborator, in the potential corroborators, to the financial transaction. The method further includes scoring the transaction description based on a function of each of the at least one corroborator to the financial transaction to obtain a verification score, and presenting, on a display device, a recommendation of the vendor to a consumer based on the verification score.

In general, in one aspect, embodiments relate to a system for transaction verification scoring a computer processor, a data repository operatively connected to the computer processor and for storing a transaction description, and a verification score for the transaction description. The system further includes a recommendation application, executing on the computer processor, operatively connected to the data repository and including a corroboration module, a scoring module, and a user interface. The corroboration module is configured to obtain, from a distributed computing system of multiple distributed computing systems distributed throughout a computing network, the transaction description describing a financial transaction with a vendor, obtain, from the distributed computing systems, transaction records of potential corroborators, and reconcile, with the financial transaction, the transaction records to obtain at least one matching transaction record of at least one corroborator, in the potential corroborators, to the financial transaction. The scoring module is configured to score the transaction description based on a function of each of the at least one corroborator to the financial transaction to obtain a verification score. The user interface is configured to present a recommendation of the vendor to a consumer based on the verification score.

In general, in one aspect, embodiments relate to a non-transitory computer readable medium including computer readable program code for obtaining, from a distributed computing system of multiple distributed computing systems distributed throughout a computing network, a transaction description describing a financial transaction with a vendor, obtaining, from the distributed computing systems, transaction records of potential corroborators, and reconciling, with the financial transaction, the transaction records to obtain at least one matching transaction record of at least one corroborator, in the multiple potential corroborators, to the financial transaction. The computer readable program code is further for scoring the transaction description based on a function of each of the at least one corroborator to the financial transaction to obtain a verification score, and presenting, on a display device, a recommendation of the vendor to a consumer based on the verification score.

Other aspects of the invention will be apparent from the following description and the appended claims.

BRIEF DESCRIPTION OF DRAWINGS

FIG. 4 shows an example in accordance with one or more embodiments of the invention.

DETAILED DESCRIPTION

Figure 1:
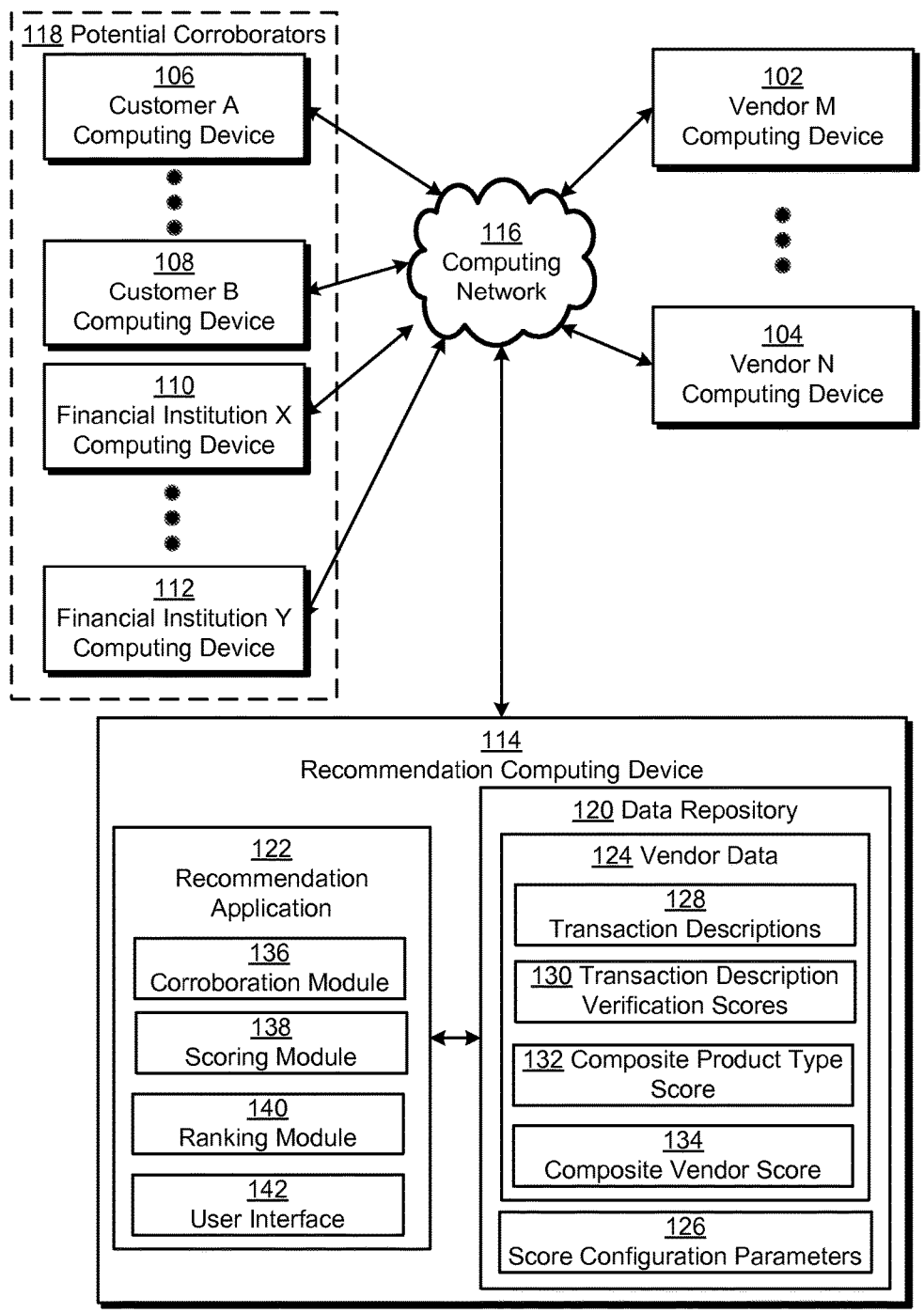
FIG. 1 shows a schematic of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A user as used herein refers to any human individual or entity that performs an action using a computing device. A user may be deemed to perform an action when an action is performed on behalf of a user. A consumer is a user that may perform a financial transaction with a vendor. Specifically, the consumer is in the market for a product. The consumer may or may not have already performed a financial transaction.

In general, embodiments of the invention are directed to addressing a technical challenge of managing anonymity on a distributed computing network. One or more embodiments of the invention verify transaction descriptions received from one or more submitters for one or more vendors. A transaction description describes a financial transaction. Transaction records for potential corroborators are received from a distributed computing system. The transaction records are reconciled to find whether any matching transaction record of a corroborator exists. The transaction description is scored according to whether a corroborator exists and the function of the corroborator. Vendors may be ranked and recommended according to the scores associated with the transaction descriptions.

FIG. 1 shows a schematic diagram of a system in accordance with one or more embodiments of the invention. As shown in FIG. 1, the system includes vendor computing device (e.g., vendor M computing device (102), vendor N computing device (104)), customer computing device (e.g., customer A computing device (106), customer B computing device (108)), financial institution computing device (e.g., financial institution X computing device (110), financial institution Y computing device (112)), and recommendation computing device (114). Each of these components is described below.

The various computing devices (e.g., vendor computing device (e.g., vendor M computing device (102), vendor N computing device (104)), customer computing device (e.g., customer A computing device (106), customer B computing device (108)), financial institution computing device (e.g., financial institution X computing device (110), financial institution Y computing device (112)) may be connected via a computing network (116). The computing network (116) is a distributed network of computing systems and may be a wide area, local area network, or a combination thereof. For example, the computing network (116) may be the Internet. Further, the various computing devices may be a computing device shown and described with respect to FIG. 10.

The various computing devices (e.g., vendor computing device (e.g., vendor M computing device (102), vendor N computing device (104)), customer computing device (e.g., customer A computing device (106), customer B computing device (108)), financial institution computing device (e.g., financial institution X computing device (110), financial institution Y computing device (112)) may include or be connected to a financial application. Specifically, the computing device may execute the financial application or may be remotely connected to the financial application, which may be a web application in such embodiments. A financial application is an application that is configured to manage financial transactions. A financial transaction is an exchange of a product (i.e., a good and/or a service) for money. Specifically, the financial application includes functionality to generate and store at least one transaction record for each financial transaction. A transaction record may include a date, monetary amount, description, identifier of one or more parties (e.g., customer, vendor) to the transaction, monetary amount, date, category, one or more products transacted, and other information. For example, the transaction record may be an invoice, a receipt, a log entry, or any other recording of a transaction. In one or more embodiments of the invention, the transaction record may include an identifier of each product transacted in the corresponding financial transaction.

The financial application may further include functionality to perform additional functions, such as to manage, maintain, and organize financial data. For example, a financial application may assist in performing a financial transaction, performing accounting tasks, filing tax returns, performing business related financial transactions (e.g., billing, payroll, credit card processing), and/or performing other financially related tasks. The financial application may also provide an interface for obtaining transaction records. Additionally, two or more of the financial applications may be the same application, the same type of application, or heterogeneous applications.

In one or more embodiments of the invention, a vendor computing device (e.g., vendor M computing device (102), vendor N computing device (104)) is a computing device used by a vendor. A vendor is a provider of one or more products. For example, a product provided by the vendor may be a good, such as plants, tools, or other good, and/or the product may be a service, such as roofing, pool maintenance, and other services. In one or more embodiments of the invention, the vendor may provide various types of products. For example, a cosmetic surgeon vendor may provide rhinoplasty, Botox, liposuction, and other types of plastic surgery.

In one or more embodiments of the invention, a customer is a receiver of one or more products from the vendor. In one or more embodiments of the invention, for each transaction, the customer may receive a single product or multiple products.

In one or more embodiments of the invention, a financial institution is a financial entity that acts as an intermediary between the customer and the vendor for the transaction of money. For example, the financial institution may be a bank, a credit card company, or other financial institution. A financial institution of the customer is a customer's financial institution. A financial institution of the vendor is the vendor's financial institution.

In one or more embodiments of the invention, one or more of the financial institution(s) and/or customer are potential corroborators (118) of a financial transaction. Specifically, the transaction records of the customer and/or financial institution may corroborate the existence of a financial transaction. The corroboration of the financial transaction verifies the occurrence of the financial transaction by the customer and the vendor. Thus, a potential corroborator is an entity that may or may not corroborate a financial transaction through a matching transaction record that corresponds to the transaction description. A corroborator has a matching transaction record.

Continuing with FIG. 1, the recommendation computing device (114) includes a data repository (120) and a recommendation application (122). In one or more embodiments of the invention, the data repository (120) is any type of storage unit and/or device (e.g., a file system, database, collection of tables, or any other storage mechanism) for storing data. Further, the data repository (120) may include multiple different storage units and/or devices. The multiple different storage units and/or devices may or may not be of the same type or located at the same physical site.

The data repository (120) includes functionality to store vendor data (124) and score configuration parameters (126). Vendor data (124) is data about a particular vendor that is used for recommendations. Specifically, vendor data (124) includes transaction descriptions (128), transaction description verification scores (130), composite product type score (132), and a composite vendor score (134) in accordance with one or more embodiments of the invention.

A transaction description (128) is a description of a particular financial transaction. For example, a transaction description may be a transaction record, a review, a user rating, an invoice, or another unique description of the transaction. The transaction description may be related in the data structure of the data repository to a vendor identifier and to one or more product identifiers. The transaction description is submitted by a submitter. In other words, the submitter is a user that submits a transaction description. In one or more embodiments of the invention, the submitter of the transaction may or may not be honest with the submission. For example, the submitter may be the vendor adding additional invoices for non-existent transactions, pretending to be a customer when submitting a review or rating, or submitting only invoices for work actually performed. As another example, the submitter may be actual customers that submit honest reviews or family members of the vendor that embellish the vendor's credentials.

In one or more embodiments of the invention, the transaction description verification scores (130) are scores assigned to each transaction. Specifically, each transaction has a corresponding score. The score defines a degree to which the transaction is verified. For example, a transaction description verified by a customer transaction record may be assigned a higher score than a transaction description that is unverified. Similarly, a transaction description verified by a financial institution transaction record may be assigned a higher score than a transaction verified only by a customer financial institution.

In one or more embodiments of the invention, composite product type score (132) is a composite score generated for a product type. Specifically, products offered by the vendor are grouped into types. Each type of product has a corresponding score that is a composite of the transaction description verification scores. A single product type may have one or more corresponding scores. For example, one score may be a combination of only the transaction description verification scores and provide an indication of how believable the vendor's transaction descriptions are for the product type. Another score may be the score generated by combining transaction descriptions with the transaction description verification score and, thereby, provide a weighted metric for the overall satisfaction of the vendor's offering of the product type.

In one or more embodiments of the invention, a composite vendor score (134) is a combined score for the vendor. A single vendor may have one or more corresponding scores. For example, one score may be a combination of only the transaction description verification scores and define a degree of trustworthiness of the vendor transaction descriptions. Another score may be the score generated by combining transaction descriptions with the transaction description verification score and, thereby, provide a weighted metric for the overall satisfaction with the vendor.

The score configuration parameters (126) correspond to the rules for assignment of scores. For example, the score configuration parameters (126) may include a default score and a score based on each permutation of possible collaborators to the transaction.

In one or more embodiments of the invention, a recommendation application (122) is connected to the data repository (120). The recommendation application (122) includes functionality to verify transaction descriptions and present recommendations to a user. In one or more embodiments of the invention, the recommendation application includes a corroboration module (136), a scoring module (138), a ranking module (140), and a user interface (142). The corroboration module (136) includes functionality to reconcile transaction records from different entities to identify matching transactions. The transaction records may be from a variety of different financial applications. In one or more embodiments of the invention, the corroboration module (136) may be or may interface with the system disclosed in FIG. 7.

The scoring module (138) includes functionality to generate transaction description verification scores (130) to a transaction description based on the function of any corroborators with respect to the financial transaction referenced in the transaction description. Further, the scoring module (138) includes functionality to generate a composite product type score (132) for each product type and the composite vendor score (134) for the vendor.

The ranking module (140) includes functionality to rank vendors based, at least, on the transaction description verification scores (130), the composite product type score (132), and the composite vendor score (134). In one or more embodiments of the invention, the ranking module includes functionality to generate a ranking that is specific to the request of a consumer. For example, if a consumer is searching or has searched for a product of a particular type, the ranking module may rank vendors according to the particular product type.

The user interface (142) includes functionality to present a recommendation to the user in accordance with one or more embodiments of the invention. The recommendation may be the ranking provided by the ranking module or another recommendation. For example, the user interface may be a web application, an electronic commerce site, an interface of the financial application, or another interface.

While FIG. 1 shows a configuration of components, other configurations may be used without departing from the scope of the invention. For example, various components may be combined to create a single component. As another example, the functionality performed by a single component may be performed by two or more components.

Figure 2:
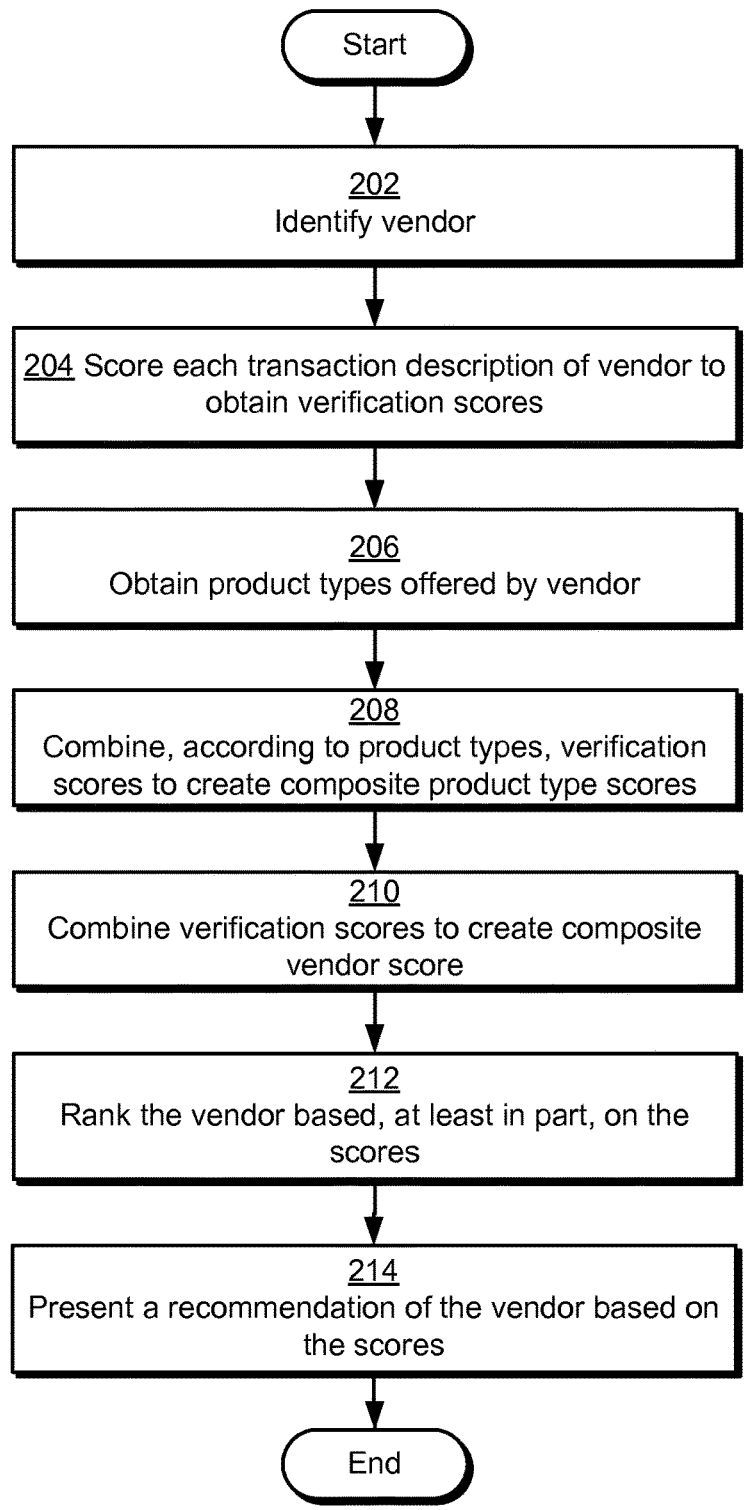
FIGS. 2-3 show flowcharts in accordance with one or more embodiments of the invention.
Figure 3:
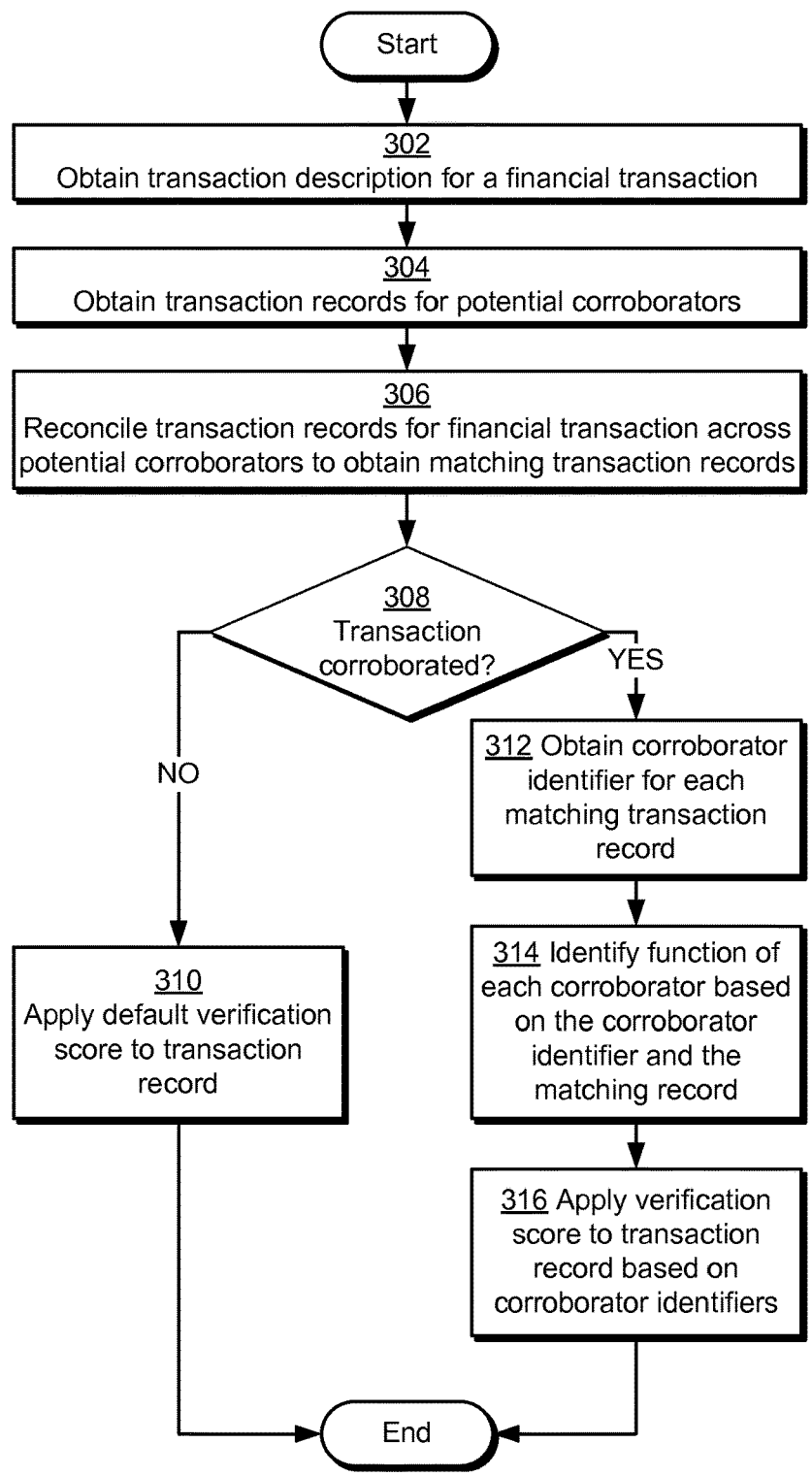

FIGS. 2 and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for performing transaction verification scoring in accordance with one or more embodiments of the invention. A vendor is identified (operation (202)). In one or more embodiments of the invention, the trigger of identifying a vendor may be based on a new vendor for which the recommendation computing device scores transaction descriptions being detected, on an existing vendor receiving a new transaction description, on a vendor who sells a product being searched for by a user, on a new recommendation application, or other trigger. In one or more embodiments of the invention, the identification of the vendor initiates the recommendation application to process one or more transaction descriptions for the vendor.

Each transaction description is scored (operation (204)) in accordance with one or more embodiments of the invention. Specifically, one or more matching transaction records for financial transaction corresponding to the transaction description are identified. The matching transaction record(s) are records of corroborators of the financial transaction. Based on the function of the corroborators, a transaction description verification score is generated and applied to the financial transaction. Generating the transaction description verification score in some embodiments is discussed below in reference to FIG. 3.

Product types offered by the vendor are obtained (operation (206)) in accordance with one or more embodiments of the invention. In one or more embodiments of the invention, obtaining the product types may be dependent on the type of recommendation application or an association of the recommendation application. For example, if the recommendation application is a part of or is associated with an electronic commerce website, the product types may be obtained by categorizing products on the electronic commerce website. Alternatively or additionally, product types may be gathered from directly or indirectly from the vendor. For example, the product types may be gathered from the vendor's website and/or by categorizing products on the vendor's website, querying the vendor, identifying products related in the data repository to or referenced by the transaction description, and/or querying the financial application of the vendor. Other techniques for obtaining the product types may be identified in accordance with one or more embodiments of the invention.

In one or more embodiments of the invention, verification scores are combined according to product types to obtain composite product type scores (operation (208)). Specifically, for each particular product type, the transaction descriptions for the particular product type are identified. The transaction description verification scores corresponding to the identified transaction descriptions are identified. In one or more embodiments of the invention, the transaction description verification scores are arithmetically combined into a single composite product type score. For example, the transaction description verification scores may be combined as an absolute or weighted average, a moving average of previous scores, or another combination. With respect to the moving average, the recommendation application may use only x number of recent transaction descriptions or transaction descriptions that are only within the last x length of time from the current time.

In one or more embodiments of the invention, additional information may be combined into the composite product type score. The composition may also be performed by having the verification scores be a weight by which transaction descriptions themselves are combined into the composite product type score. For example, if a transaction description is a rating, the amount of the rating may be arithmetically combined with the corresponding transaction description verification score. Such a combination may result in a high rating that is not verifiable by transaction records being given a low weight when combined into the product type score and the low rating that is verified being given a high weight when combined into the composite product type score. Similarly, if the transaction description is a review, a numeric value may be assigned to the review based on content and combined with the transaction description verification score and other transaction descriptions into the composite product type score.

Alternatively or additionally, the product description verification score may be used as a mechanism to remove product descriptions from recommendations. In other words, if the product description verification score fails to comply with a minimum threshold, then the corresponding product description may be removed for being deemed untrustworthy.

In one or more embodiments of the invention, verification scores are combined to create a composite vendor score (operation (210)). In other words, the transaction description verification scores may be combined into the composite vendor score and/or the composite product type scores may be combined into the composite vendor score. The combination may be performed in a same or similar manner to combining to create the composite product type scores with the change that the scores for all product types are combined. In one or more embodiments of the invention, the combination may be weighted by the number of each product or the number of product types. For example, if the composite product type scores are used, each composite product type score may be multiplied by a weight reflecting the number of products of the particular product type sold. Thus, if a cosmetic surgeon does 50 Botox injections and only three liposuctions, the composite vendor score reflects the greater number of Botox injections regardless of the number of transaction descriptions submitted for Botox injections and liposuctions. The number of products may be gathered based on the transaction records and other accounting information maintained by the vendor's financial application.

The vendor is ranked based, at least in part, on the scores (operation (212)) in accordance with one or more embodiments of the invention. The ranking may be with other vendors and may be an ordered listing of the vendor. In one or more embodiments of the invention, when a consumer accesses the recommendation application, the consumer may be searching for a particular vendor, product type, or product. If searching for a particular vendor, the ranking may be performed by adding the vendor in a set of alternate possible vendors according to the composite vendor score. If searching for a particular product type, the ranking may be of all vendors that provide that particular product type according to the product type score for the particular product type. If searching for a particular product, the ranking may be the combination of the product description verification scores for the particular product. In one or more embodiments of the invention, the ranking is based on the scores when the scores dictate whether the product description or even vendor is added to the ranking. Specifically, if the product description is deemed untrustworthy, the product description may not be used in the scores for the ranking. Further, if the vendor is deemed to have more than a threshold number of product descriptions deemed untrustworthy, the vendor may be removed from the ranking. Other mechanisms for ranking the vendor may be used without departing from the scope of the invention.

The vendor is recommended based on the scores (operation (212)) in accordance with one or more embodiments of the invention. The recommendation may be a binary recommendation (e.g., a statement to transaction or not to transaction with vendor. Alternatively or additionally, the recommendation may be a display of the product description verification score, composite product type score, composite vendor score, and/or ranking may be displayed on a display device to a user with the product, product type, and/or vendor. Alternatively or additionally, the verification scores may dictate what and how vendors are displayed. For example, product descriptions that fail to satisfy a threshold may be omitted from the display or displayed with a warning. Viewing a warning, a user may decide to ignore the particular product description or give less credence to the particular product description over other product descriptions. The display may be in a user interface of a financial application, in an electronic commerce website, or other interface.

The above description of FIG. 2 provides several mechanisms for incorporating the product description verification scores into a presentation. In particular, as discussed above, the product description verification scores may be used in the generation of other scores and in the presentation. Other uses of the product description verification scores and presentations of recommendations that directly or indirectly rely on product description verification scores may be used with the product description verification scores without departing from the scope of the invention.

FIG. 3 shows a flowchart for generating the product description verification score in accordance with one or more embodiments of the invention. In one or more embodiments of the invention, a transaction description for a financial transaction is obtained (operation (302)). In one or more embodiments of the invention, the transaction description that is obtained may be a new transaction description submitted by a submitter and/or an unprocessed transaction description. For example, if a new vendor is being added to the recommendation application, the recommendation application may iterate through transaction descriptions. In such a scenario, the transaction description may be the next transaction description to process.

In one or more embodiments of the invention, transaction records for potential corroborators are obtained (operation (304)). In one or more embodiments of the invention, the transaction records may be obtained from the financial applications. For example, for financial institutions, the transaction records may be obtained using the application programming interface of the financial institution for a particular user of the financial institution. By way of a more explicit example, the vendor may provide, to the vendor's financial application, login credentials to access the vendor's account at the vendor's financial institution. In response, the vendor's financial application may use the login credentials to obtain the transaction records of the financial institution for the vendor. The transaction records of the financial institution are different than the transaction records of the vendor in that the vendor may directly enter the vendor's transaction records to the financial application, whereas the financial institution creates the financial institution's transaction records that are downloaded to the financial application. The recommendation application may obtain the transaction records from the financial application. For example, the transaction records may be stored in a data repository accessible by the recommendation application. The accessibility may be based on an agreement between the vendor of the recommendation application, and one or more vendors of the various financial applications, or based on being the same vendor for both applications. Alternatively, the accessibility may be granted based on permission by the vendor, customer, and/or financial institution to the recommendation application. In one or more embodiments of the invention, similar operations may be performed to access transaction records for the customer and transaction records for the financial institution of the customer.

In one or more embodiments of the invention, when a transaction description is obtained, the transaction description may or may not reflect or include a specific indication of the financial transaction. Thus, at least some of the obtained transaction records may be for other financial transactions and for customers that are not party to the financial transaction.

The transaction records for the financial transaction across potential corroborators are reconciled to identify matching transaction records (operation (306)) in accordance with one or more embodiments of the invention. In other words, the reconciliation application uses information from the transaction description to identify, across the potential corroborators, which transaction records correspond to the financial transaction by the transaction description. One mechanism for performing the reconciliation is to use the commerce network described below and in reference to FIGS. 5-9. In the commerce network, the interaction is the financial transaction and communications associated therewith, and the entities are the vendor, customer, and financial institution in accordance with one or more embodiments of the invention.

A unique identifier for the financial transaction may be generated based on the transaction description. For example, the unique identifier may be a combination of two or more of the following: time, date, vendor identifier, customer identifier, product, and amount of transaction. Any transaction record having the unique identifier (i.e., combination of data) may be deemed a matching transaction record.

The above are only examples for reconciling transaction records. Other mechanisms for reconciling transactions records may be used without departing from the scope of the invention.

Continuing with FIG. 3, a determination is made whether the transaction is corroborated (operation (308)) in accordance with one or more embodiments of the invention. Specifically, a determination is made whether a matching transaction record exists. If the transaction is not corroborated, a default verification score is applied to the transaction record (operation (310)). In one or more embodiments of the invention, the default verification score is a configurable score that indicates the transaction record may not be trustworthy.

If the transaction is corroborated and at least one matching transaction record exists, the corroborator identifier for each matching transaction record is obtained (operation (312)) in accordance with one or more embodiments of the invention. In particular, for each matching transaction record, the corroborators are identified.

In one or more embodiments of the invention, the function of each corroborator is identified (operation (314)). Specifically, the same individual may be a vendor for some financial transactions and a customer for other financial transactions. Similarly, a financial institution may be the financial institution of the vendor, the customer, or both. Thus, for a vendor or customer financial transaction record, the determination may be based on whether the amount has a positive or negative amount on the account balance, thereby indicating whether the entity is a payer or payee. If a payer, then the transaction record is for a customer, and, if payee, then the transaction record is for the vendor. For a financial institution, the determination may be based on whose account the transaction record is stored. Thus, if the account is the vendor's account at the financial institution, then the function of the financial institution is the vendor's financial institution. If the account is the customer's account at the financial institution, then the function of the financial institution is the customer's financial institution.

In one or more embodiments of the invention, the verification score is applied to the transaction record based on the corroborator identifiers (operation (316)) in accordance with one or more embodiments of the invention. For example, for each corroborator, a specific value may be added to the verification score. For example, for each financial institution corroborator, a value of 20 may be added to the verification score and, for each customer and merchant, a value of 10 may be added. In the example, the total of the specific values is applied as the verification score for the transaction description.

Another mechanism for applying a verification score is by configuring a score for each possible permutation of corroborators. Then, based on the particular permutation of corroborator identifiers and the function of each corroborator, the verification score is applied to the transaction.

FIG. 4 shows an example chart of possible permutations and corresponding verification scores. The following example is for explanatory purposes only and not intended to limit the scope of the invention. In the example in FIG. 4 consider the scenario in which the transaction description is invoices of the vendor. The recommendation application makes recommendations based on the number of sales that a vendor has as reflected in the vendor's invoices. In other words, the more sales that the vendor has, the more the vendor is recommended. Because of the motivation to have more sales, the vendor may be inclined to create more invoices.

FIG. 4 shows an example chart (400) in which each of the first four columns is a function of an entity (e.g., vendor (402), vendor financial institution (404), customer financial institution (406), customer (408)) with respect to a transaction. A yes in the example chart indicates that the corresponding entity has a matching transaction record, and a no in the chart indicates that the corresponding entity does not have a matching transaction record. Each row in the chart represents a possible permutation. The verification score (410) in the last column is the score to assign to the transaction.

Thus, consider the example in which a vendor submits to their financial application, a first invoice. The first invoice cannot be verified based on transaction records. Thus, when determining whether to recommend the vendor, the first invoice is assigned a score of 5 based on the example chart. In other words, the recommendation application may deem the first invoice to be untrustworthy and possibly reflective of the vendor adding false invoices in order to obtain recommendations.

However, in another example, the vendor submits a second invoice, which is verified by the customer's financial institution and the customer. In the second example, the second invoice is assigned a score of 75 indicating that the recommendation application determines the second invoice is trustworthy. Thus, when making recommendations, the second invoice is deemed more trustworthy than the first invoice because the second invoice is corroborated.

Over time, in the example, a vendor that submits false invoices may be deemed untrustworthy and may have a low composite vendor score. In the example, the recommendation application may deny recommending such a vendor. Conversely, in the example, a vendor that submits invoices that are capable of being corroborated may have a greater composite vendor score and, thus, recommended to consumers.

FIG. 4 is only an example chart. Other permutations and scores may be applied without departing from the scope of the invention.

Figure 5:
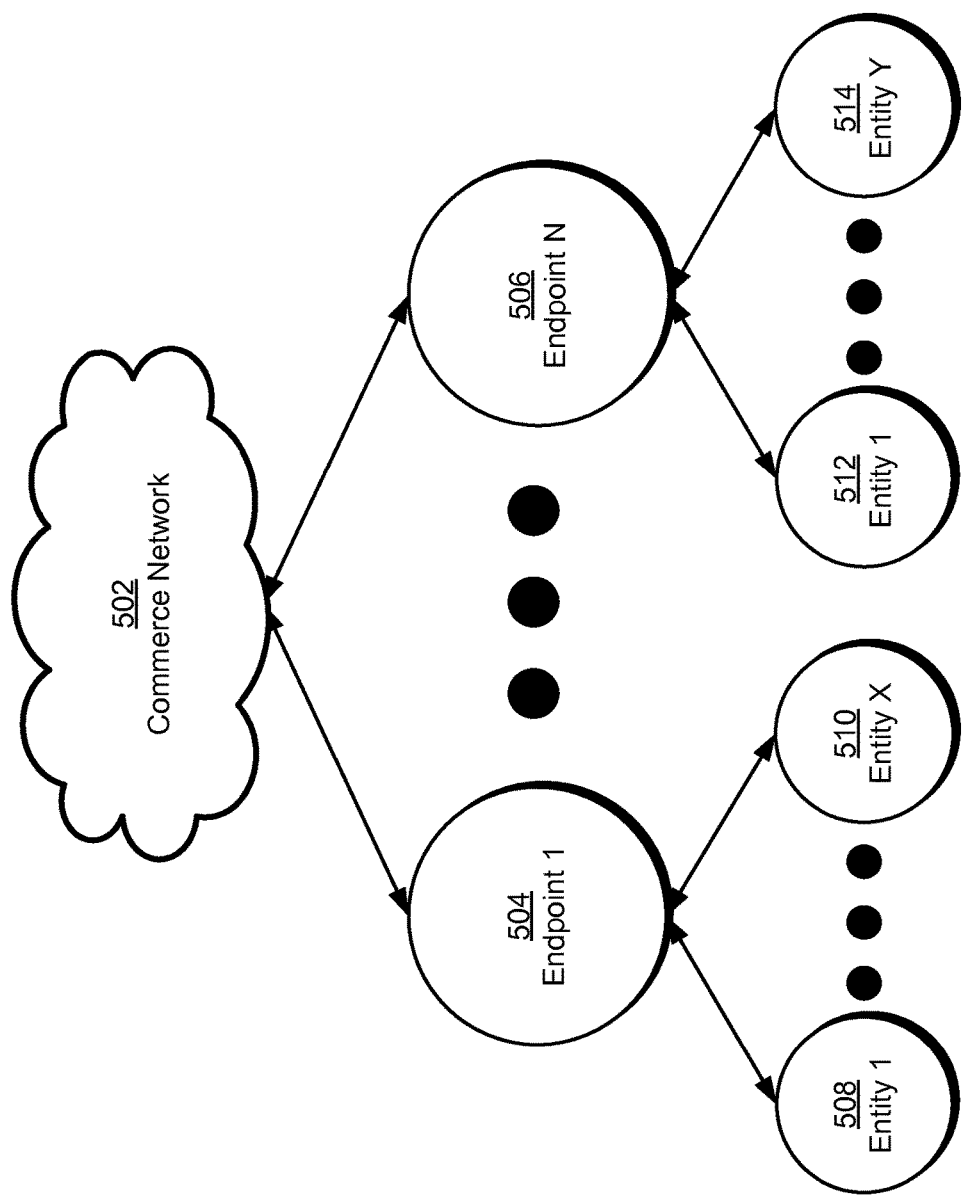
FIG. 5 shows a schematic of a system in accordance with one or more embodiments of the invention.

As discussed above, one or more embodiments may use a method and system for facilitating business interaction. As shown in FIG. 5, the business interaction may be conducted through a set of endpoints (e.g., endpoint 1 (504), endpoint n (506)) of a commerce network (502) by one or more sets of entities (e.g., entity 1 (508), entity x (510), entity 1 (512), entity y (514)). Each entity may represent an individual, an organization (e.g., small business, company, non-profit organization, etc.), and/or a representative of the organization. In addition, the entities may use the endpoints and commerce network (502) to manage employees and payroll, generate and pay invoices, order inventory, file taxes, track accounts, and/or perform other operations related to financial transactions and/or commerce.

Each endpoint may provide an application, system, and/or platform used by a set of entities to manage finances and/or conduct financial transactions. For example, the endpoint may be a natively installed, mobile, and/or web-based accounting application, tax-preparation application, investment-management application, contract- and/or spend-management application, customer-relationship-management application, enterprise resource planning (ERP) system, and/or other type of software system that facilitates management of business and/or financial interactions for entities using the software system.

The endpoint may also provide an interface for accessing commerce network (502). For example, the endpoint may connect to a set of services provided by commerce network (502) to facilitate commerce and/or business interactions (e.g., financial transactions) with entities at other endpoints of commerce network (502). In turn, commerce network (502) may connect the endpoints and allow the commerce and/or business interactions to occur across the endpoints. For example, commerce network (502) may aggregate data associated with the entities and interactions from the endpoints, enable access to the data by entities involved in the interactions through the endpoints, and/or allow the entities to interact through different endpoints.

In one or more embodiments, data associated with the entities, endpoints, and/or interactions is stored in a model of commerce network (502). As discussed in further detail below with respect to FIG. 6, the model may include unique identities for the entities, relationships among the entities, interactions related to commerce among the entities, and/or a set of activities associated with the entities. The model may then be updated based on the interactions and/or used to enable interactions among the entities across the endpoints, as discussed in further detail below with respect to FIG. 7.

Figure 6:
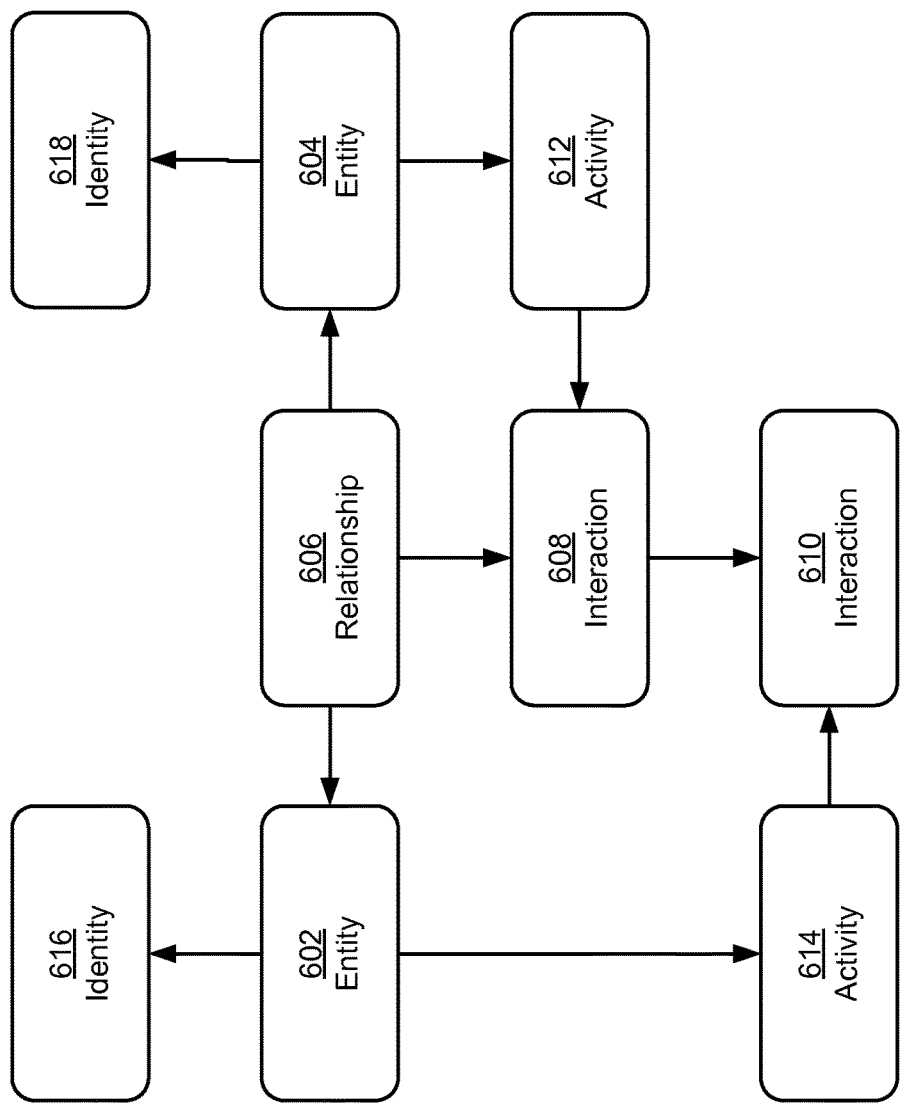
FIG. 6 shows an exemplary set of components in a model of a commerce network in accordance with one or more embodiments of the invention.

FIG. 6 shows an exemplary set of components in a model of a commerce network (e.g., commerce network (502) of FIG. 5) in accordance with one or more embodiments of the invention. As shown in FIG. 6, the model may include a set of entities (602-604), a relationship (606) between entities (602-604), a set of interactions (608-610) related to commerce between entities (602-604), and a set of activities (612-614) associated with entities (602-604).

The model may be represented as a graph with entities (602-604), relationship (606), interactions (608-610), and/or activities (612-614) as nodes that are connected by edges. The model may be created and/or updated by batch-processing data from the endpoints and/or obtaining the data from the endpoints in real-time (e.g., as the commerce network is used).

As mentioned above, entities (602-604) may represent individuals, organizations, and/or representatives of the organizations. For example, entities (602-604) may include names, descriptions, contact information, and/or other details associated with the corresponding individuals, organizations, and/or representatives. Details associated with entities (602-604) may be obtained from the endpoints used by entities (602-604). In addition, the representation of a particular individual, organization, and/or representative by each entity (602-604) may be associated with a level of "confidence," which is adjusted based on information known about the entity and/or use of the commerce network by the entity.

Each entity (602-604) is associated with a unique identity (616-618) that distinguishes the entity from other entities in the model and/or commerce network. For example, each identity (616-618) may include a unique identifier (ID) and/or authentication context for the corresponding entity. The unique ID may be linked to unique IDs in external networks and/or endpoints to enable interactions (e.g., interactions (608-610)) among multiple networks. To facilitate verification of the identity, the unique ID may also be linked to a standardized and/or well-known identifier such as a Taxpayer Identification Number (TIN) and/or Data Universal Numbering System (DUNS) number. The identity may then be used to manage access to services and/or data in the commerce network by the entity. In other words, identities (616-618) may be used in identity and access management (IAM) of entities (602-604).

Relationship (606) may establish a link between entities (602-604). In addition, relationship (606) may be explicit, implicit, or latent. An explicit relationship (606) between entities (602-604) may be declared by one or both entities (602-604) during use of the commerce network and/or one or more endpoints of the commerce network. For example, one or both entities (602-604) may explicitly label the other entity as a friend, contact, acquaintance, family member, customer, employer, business associate, and/or vendor. The explicitly declared relationship may also be confirmed by the other entity before the relationship is labeled as explicit within the model.

On the other hand, an implicit relationship (606) may be formed through interactions (608-610) between entities (602-604). For example, an implicit relationship may be established after an invoice, payment, message, estimate, and/or other information is transmitted between entities (602-604). The implicit relationship may also be based on historical interactions between entities (602-604).

Finally, a latent relationship (606) between entities (602-604) may be implied based on relationships and/or interactions between entities (602-604) and/or other entities in the commerce network, as indicated through analysis of the model. For example, entities (602-604) may have a latent relationship if entities (602-604) share relationships with a large number of other entities in the commerce network and/or frequently interact with the same entities in the commerce network.

Interactions (608-610) are associated with the exchange of one or more artifacts between entities (602-604). For example, interactions (608-610) may include the transmission and/or exchange of invoices, payments, estimates, receipts, emails, messages, chats, purchase orders, reviews, and/or other information or documents between entities (602-604). To carry out an interaction from interactions (608-610), an artifact and/or identifying information for one or more target entities may be obtained from an entity initiating the interaction. Next, the identifying information may be matched to the target entities and/or identities of the target entities in the model, and access to the artifact may be enabled for the target entities, as described in further detail below with respect to FIG. 7.

As described above, interactions (608-610) may be used to establish relationship (606). Interactions (608-610) may also be used to modulate the "strength" of relationship (606). For example, a numeric value representing the strength of an explicit and/or implicit relationship (606) may increase with the number of interactions (608-610) and/or "important" interactions such as payments, receipts, and/or contracts. Conversely, the numeric value may be lower if entities (602-604) have fewer interactions and/or have interactions that are less "important" (e.g., messages, estimates, promotions, etc.).

Moreover, interactions (608-610) may be chained, in which one interaction (e.g., interaction (608)) may result in an update of relationship (606) and the subsequent enabling of another interaction (e.g., interaction (610)). For example, interaction (608) may include the exchange of an invoice between entities (602-604), thereby establishing relationship (606) between entities (602-604). After interaction (608) has completed, a subsequent interaction (610) involving the payment of the invoice may be enabled and/or conducted. The strength of relationship (606) may also be increased after each interaction (608-610), and subsequent interactions may be enabled based on the increase in the strength of relationship (606).

Finally, entities (602-604) may perform one or more activities (612-614) related to interactions (608-610) and/or use of the commerce network. In turn, activities (612-614) may be used to create, read, update, and/or delete other components of the model. For example, activity (612) may include the transmission of an invoice from entity (604) to entity (602), thus establishing interaction (608) and/or modifying one or more elements of relationship (606) and/or entities (602-604). In turn, activity (614) may include the payment of the invoice by entity (602), which establishes interaction (610) and/or further modifies one or more elements of relationship (606) and/or entities (602-604).

Conversely, entities (602-604) may take part in activities that are not related to interactions (608-610). For example, entities (602-604) may perform activities related to joining of the commerce network, accessing and/or using services provided by the commerce network, explicitly declaring relationship (606) and/or relationships with other entities, and/or filling in profiles for entities (602-604). The activities may be recorded and/or used to update entities (602-604), identities (616-618), and/or relationship (606).

Figure 7:
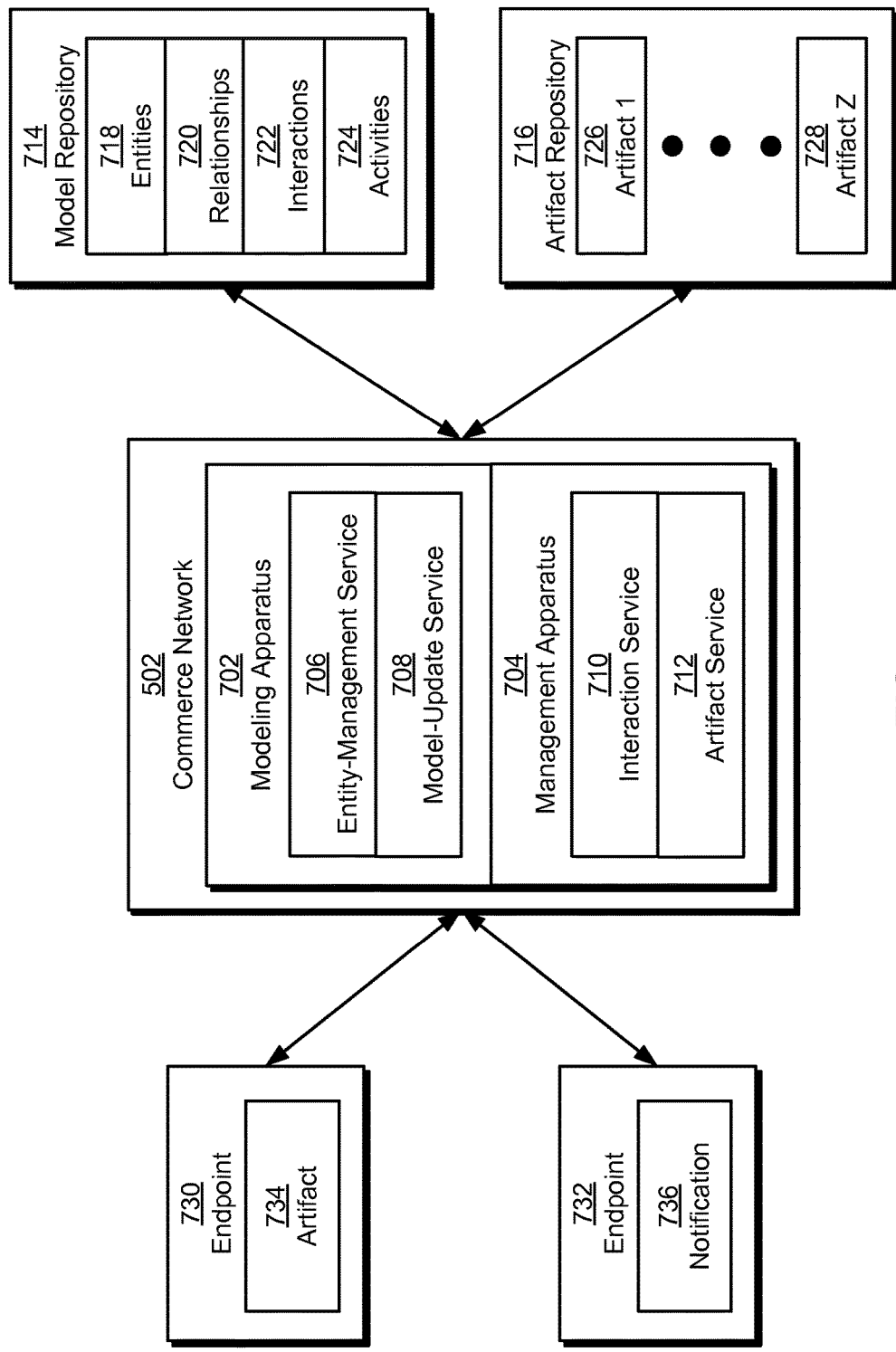
FIG. 7 shows a system for facilitating business interaction in accordance with one or more embodiments of the invention.

FIG. 7 shows a system for facilitating business interaction in accordance with one or more embodiments of the invention. More specifically, FIG. 7 shows a system for enabling interaction among entities (e.g., entities (718)) of commerce network (502) independently of a set of endpoints (730-732) used by the entities to access commerce network (502). As shown in FIG. 7, the system includes a modeling apparatus (702) and a management apparatus (704) within commerce network (502). Each of these components is described in further detail below.

Modeling apparatus (702) may be used to create, read, update, and/or delete components of a model of commerce network (502), such as the model of FIG. 2. As mentioned above, the model may be created and/or updated using historical data and/or real-time data from endpoints (730-732). The components may be stored in a model repository (714) as a set of entities (718), a set of relationships (720) among entities (718), a set of interactions (722) related to commerce among entities (718), and/or a set of activities (724) associated with entities (718). For example, entities (718), relationships (720), interactions (722), and/or activities (724) may be stored in a graph database, relational database, and/or other type of structured data storage.

Within modeling apparatus (702), an entity-management service (706) may manage entities (718) and the identities of entities (718). For example, entity-management service (706) may manage entities (718) representing individuals, organizations, and/or representatives of the organizations based on information obtained from endpoints (730-732) and/or commerce network (502) and/or use of endpoints (730-732) and/or commerce network (502) by the individuals, organizations, and/or representatives. Within each entity, entity-management service (706) may maintain a set of attributes and/or details for the entity, including a name, address, tax identifier, DUNS number, and/or other information for the identity. Entity-management service (706) may also aggregate the attributes and/or details from multiple endpoints (730-732) used by the entity so that a single view of the entity is shown within commerce network (502).

Modeling apparatus (702) may also include a model-update service (708) that enables use of the model with commerce network (502). For example, model-update service (708) may track relationships (720) and/or other interactions (722) based on entities (718) and/or activities (724) and allow endpoints (730-732) to access the model. Model-update service (708) may also expose relationships (720) as explicit, implicit, and/or latent; identify nodes and edges of the model; and perform merges and/or splits of the nodes while managing associated changes to relationships (720). In other words, model-update service (708) may enable use of the model by endpoints (730-732) and/or other parts of commerce network (502) while managing and/or updating the model based on use of commerce network (502) by entities (718).

Management apparatus (704) may use the model to enable an interaction among two or more entities from the set of entities (718) independently of endpoints (730-732) used by the entities to access commerce network (502). As described above, the interaction may involve the exchange of an artifact (734) among the entities. Artifact (734) may be a message, document, payment, email, and/or other attribute and/or information related to the interaction. Artifact (734) may be obtained from an entity initiating the interaction by an endpoint (e.g., endpoint (730)) used by the entity to access commerce network (502).

An artifact service (712) may store artifact (734) in an artifact repository (716), along with other artifacts (e.g., artifact 1 (726), artifact z (728)) from other interactions within commerce network (502). For example, artifact service (712) may store the artifacts in a relational database, file system, and/or other structured storage mechanism for documents, messages, and/or data. Artifact service (712) may also manage the subsequent retrieval of the artifacts from artifact repository (716) during interactions and/or activities associated with the artifacts.

To enable the interaction, an interaction service (710) in management apparatus (704) may route the interaction and/or artifact (734) from a first entity initiating the interaction to one or more other entities targeted by the interaction. For example, interaction service (710) may use information from model-update service (708) to determine one or more endpoints associated with the targeted entities and transmit a notification (736) to the endpoint(s) (e.g., endpoint (732)). Interaction service (710) may also maintain a record of the initiated interaction for subsequent analysis and/or use by modeling apparatus (702) in updating the model. Alternatively, interaction service (710) may prevent the interaction from occurring and/or omit notification (736) if model-update service (708) indicates that the first entity is fraudulent and/or otherwise not permitted to interact with the other entities.

After notification (736) is received by the other entities, the other entities may use notification (736) to access artifact (734). For example, the other entities may use a link in notification (736) to query artifact service (712) for artifact (734), and artifact service (712) may provide artifact (734) in response to the query if the other entities are granted access to artifact (734). On the other hand, interaction service (710) may transmit artifact (734) directly to the other entities in lieu of notification (736).

Activities associated with the interaction may then be used by modeling apparatus (702) to update the model. For example, transmission of artifact (734) from the first entity to commerce network (502) may be used to establish relationships between the first entity and the other entities, and retrieval of artifact (734) by the other entities may be used to strengthen the relationships. Information from artifact (734) may also be used to update attributes and/or details of the entity and/or other entities within the model.

Informational notifications related to activities in commerce network (502) may also be generated and transmitted to entities in commerce network (502) independently of the entities' participation in the activities. For example, changes to and/or announcements by an entity may trigger the transmission of notifications of the changes and/or announcements to entities that have subscribed to the notifications and/or have existing (e.g., explicit, implicit, and/or latent) relationships with the entity.

The updated model may then be used to enable one or more subsequent interactions among the entities. For example, management apparatus (704) may allow an entity that received an invoice in a previous interaction to pay the invoice in a subsequent interaction, ask a question related to the invoice, and/or request a revision of the invoice. Similarly, management apparatus (704) may allow an entity that received a message and/or question in a previous interaction to provide a response to the message and/or question in a subsequent interaction.

In one or more embodiments, endpoints (730-732) include a consumer endpoint, a business endpoint, an external endpoint, and/or a generic endpoint. The consumer endpoint may facilitate financial management and/or transactions for individual users of commerce network (502). For example, the consumer endpoint may allow individuals to manage personal finances, file taxes, and/or perform financial transactions related to the personal finances. On the other hand, the business endpoint may provide financial and/or business services for organizational users of commerce network (502). For example, the business endpoint may allow an organization and/or a representative of the organization to generate and/or manage invoices, payments, receipts, estimates, payroll, taxes, and/or other business and/or financial transactions for the organization.

The external endpoint may include a platform, system, and/or network that is independently developed and/or managed outside commerce network (502) but is connected to commerce network (502) using an interface. For example, the external endpoint may be a third-party application and/or service that accesses commerce network (502) and/or communicates with other endpoints of commerce network (502) through the interface. The inclusion of the external endpoint and entities using the external endpoint in commerce network (502) may facilitate interactions between the entities and other entities in commerce network (502), as well as an increase in value of commerce network (502) to all entities using commerce network (502).

The generic endpoint may facilitate the use of commerce network (502) by entities that are not currently registered with commerce network (502) and/or other endpoints of commerce network (502). For example, the generic endpoint may be used by a user who does not have an existing user account with a consumer endpoint, business endpoint, and/or external endpoint of commerce network (502).

In addition, a non-registered entity may be exposed to the generic endpoint in response to an interaction from an entity that is registered within commerce network (502). For example, the registered entity may initiate the interaction by providing an invoice and an email address of the non-registered entity. Interaction service (710) may enable the interaction by sending an email containing a link to the invoice to the email address, and entity-management service (706) may add the non-registered entity to the model. The non-registered entity may then use the link to access commerce network (502) through a web browser and obtain the invoice from artifact service (712). Finally, modeling apparatus (702) may update the model with subsequent use of commerce network (502) by the non-registered entity, such as payment of the invoice and/or registration of the non-registered entity with commerce network (502). In this way, the generic endpoint may facilitate viral growth in the number of registered entities in the commerce network, as well as use of the commerce network by the entities.

In one or more embodiments, commerce network (502) enables access to artifacts in interactions involving non-registered entities without requiring authentication of the non-registered entities. Such unauthenticated access may expedite completion of the interactions by the non-registered entities while maintaining access control for the artifacts. Enabling access to artifacts in interactions for non-registered entities is described in a co-pending non-provisional application by inventor C alum G. Murray entitled "Unauthenticated Access to Artifacts in Commerce Networks," having Ser. No. 13/911,903, and filing date Jun. 6, 2013, Issued as U.S. Pat. No. 9,722,982, which is incorporated herein by reference.

The model may thus provide a mechanism for enabling interaction across multiple endpoints (e.g., endpoints (730-732)) of commerce network (502), including interaction with non-registered entities and/or interaction between entities that lack a pre-existing relationship and/or history of interaction. Updates to the model based on the interaction and/or activities associated with the interaction may further facilitate use of commerce network (502) by enabling subsequent interaction among the entities and/or the receipt of notifications to changes in the entities and/or relationships. In addition, the use of endpoints to access commerce network (502) may allow endpoints to be added to commerce network (502) over time, thus increasing the capability and/or flexibility of commerce network (502). Finally, the model may be used to identify and/or develop insights into patterns and/or trends associated with the entities and/or the entities' behavior. For example, the model may be analyzed to determine valuable relationships and/or interactions among the entities, assess the entities' reputations, identify common attributes in an entity's relationships and/or interactions, and/or identify chains of relationships and/or interactions among the entities.

Figure 8:
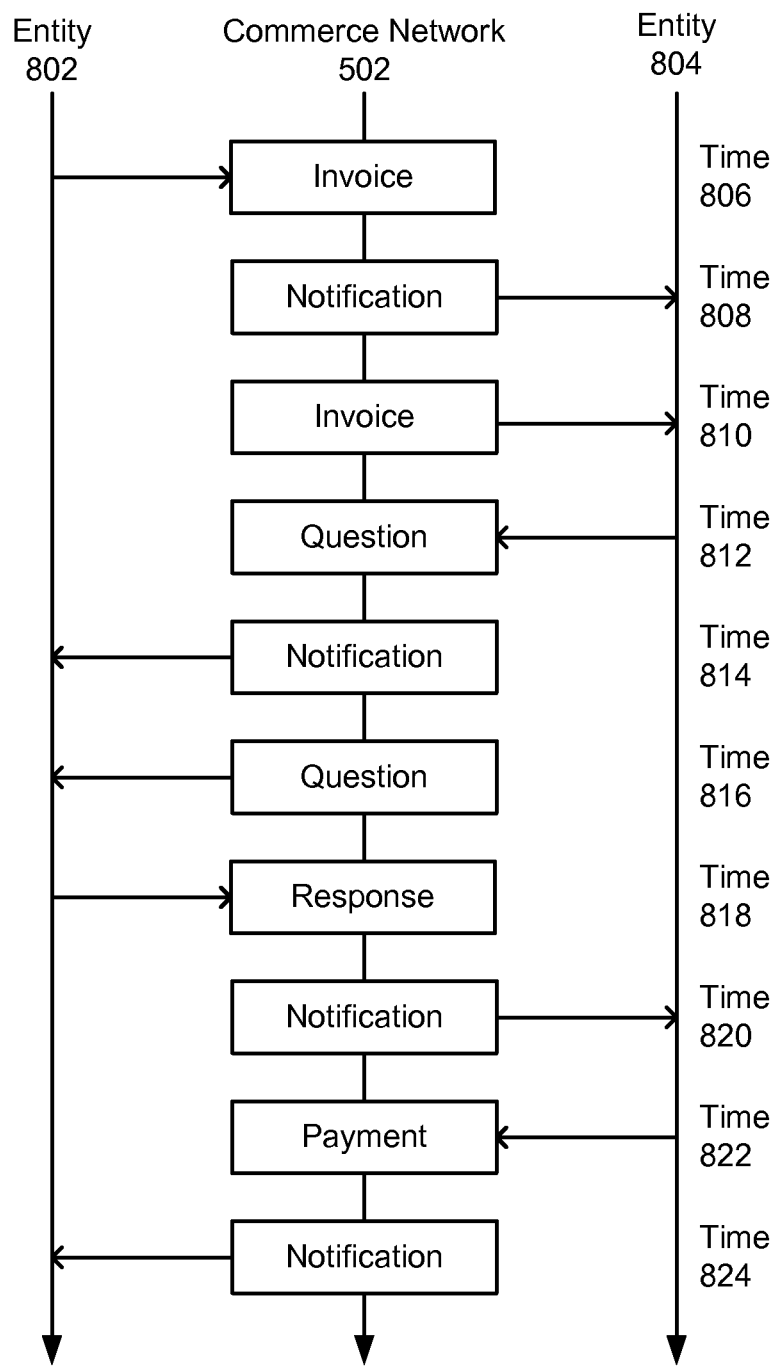
FIG. 8 shows an exemplary timeline of a series of interactions between two entities of a commerce network in accordance with one or more embodiments of the invention.

FIG. 8 shows an exemplary timeline of a series of interactions between two entities (802-804) of commerce network (502) in accordance with one or more embodiments of the invention. Entities (802-804) may be individuals, organizations, and/or representatives of the organizations that are engaged in commerce with one another. To facilitate the commerce, commerce network (502) may enable the interactions independently of a set of endpoints used by entities (802-804) to access commerce network (502).

Beginning with time (806), entity (802) may initiate an interaction by transmitting an invoice destined for entity (804) to commerce network (502). Commerce network (502) may store the invoice and use a model of commerce network (502) to transmit a notification of the invoice to entity (804) at time (808). To transmit the notification, commerce network (502) may obtain a name, email address, and/or other identifier for entity (804) from the interaction and match the identifier to entity (804) in the model. Commerce network (502) may then route the notification to entity (804) based on one or more endpoints used by entity (804). For example, commerce network (502) may send the notification as a message to an endpoint that is both used by entity (804) and most closely related to the endpoint used by entity (802) to send the invoice. Alternatively, if entity (804) is not registered with commerce network (502), commerce network (502) may transmit the notification as an email, text message, and/or other communication to the identifier for entity (804). Commerce network (502) may also route the notification based on criteria and/or priorities such as marketing goals, endpoint affinity, and/or cost.

At time (810), entity (804) may use the notification to retrieve the invoice from commerce network (502). For example, entity (804) may provide authentication credentials to the endpoint to which the notification is routed to access the notification. If the endpoint used by entity (804) to access the invoice is the generic endpoint, entity (804) may obtain the invoice from commerce network (502) without providing authentication credentials. Next, entity (804) may use a link in the notification to obtain the invoice from commerce network (502). After the invoice is obtained by entity (804), the interaction associated with transmitting the invoice may be complete.

At time (812), entity (804) may initiate a second interaction by providing a question to commerce network (502). Commerce network (502) may receive the question, generate a notification of the question, and route the notification to entity (802) at time (814). At time (816), entity (802) may use the notification to obtain the question from commerce network (502), thus completing the second interaction. Alternatively, commerce network (502) may transmit the question directly to entity (802) (e.g., through the endpoint used by entity (802)) after receiving the question from entity (804).

At time (818), entity (802) may initiate a third interaction with entity (804) by providing a response to the question. At time (820), commerce network (502) may generate and route a notification of the response to entity (804). For example, commerce network (502) may transmit a message, email, and/or text message containing the response and details of the invoice to entity (804). Alternatively, commerce network (502) may include a link to the response and/or invoice within a notification, and entity (804) may use the link to access the response and/or invoice.

At time (822), entity (804) may initiate a fourth interaction by providing payment of the invoice to commerce network (502). The payment may be processed by commerce network (502), an automated payment system connected to commerce network (502) via an endpoint, and/or the endpoint used by entity (804) to access commerce network (502). Finally, at time (824), commerce network (502) may provide a notification of the payment to entity (802), thus concluding the fourth interaction.

Figure 9:
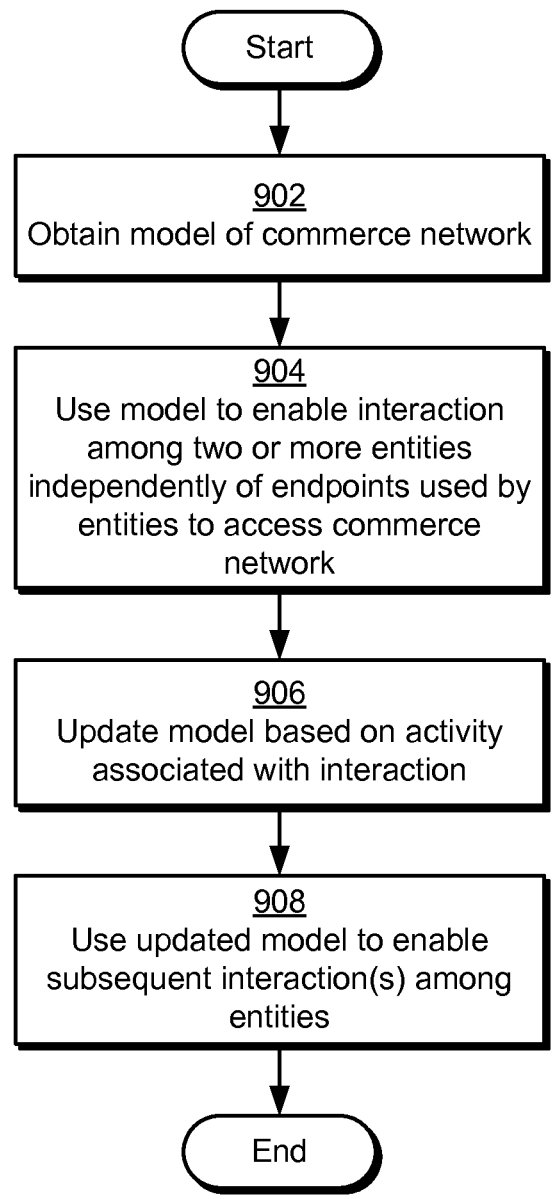
FIG. 9 shows a flowchart illustrating the process of facilitating business interaction in accordance with one or more embodiments of the invention.

FIG. 9 shows a flowchart illustrating the process of facilitating business interaction in accordance with one or more embodiments of the invention. In one or more embodiments, one or more of the steps may be omitted, repeated, and/or performed in a different order. Accordingly, the specific arrangement of steps shown in FIG. 9 should not be construed as limiting the scope of the embodiments.

Initially, a model of a commerce network is obtained (operation (902)). The model may include a set of entities, a set of relationships among the entities, a set of interactions related to commerce among the entities, and a set of activities associated with the entities. The entities may include individuals, organizations, and/or representatives of the organizations. Each relationship may be explicit (e.g., declared by one or more entities in the relationship), implicit (e.g., formed by one or more interactions), and/or latent (e.g., based on analysis of the model). Each interaction may be associated with an exchange of an artifact among two or more of the entities. Each activity may then be used to update the other components of the model.

Next, the model is used to enable an interaction among two or more entities from the set of entities independently of a set of endpoints used by the entities to access the commerce network (operation (904)). To enable the interaction, a notification associated with the interaction may be generated and routed to one or more of the endpoints based on the model. For example, the notification may be transmitted to an endpoint used by an entity targeted in the interaction to allow the entity to participate in the interaction and/or obtain the artifact associated with the interaction through the endpoint. The notification may also be transmitted to multiple endpoints if multiple entities are targeted in the interaction and more than one endpoint is used by the targeted entities to access the commerce network. Alternatively, the interaction and/or artifact may be routed directly to the targeted entities in lieu of the notification.

The model may then be updated based on an activity associated with the interaction (operation (906)). For example, a first entity may create an invoice within an endpoint and specify an email address, phone number, name, and/or other identifying information for a second entity for which the invoice is destined. As a result, the first entity may perform a first activity that initiates an interaction with the second entity and/or establishes a relationship between the first and second entities. Next, the second entity may obtain the invoice from the endpoint and/or commerce network using a notification of the invoice from the commerce network. Consequently, the second entity may perform a second activity that completes the interaction and/or strengthens the relationship.

Finally, the updated model may be used to enable one or more subsequent interactions among the entities (operation (908)). Continuing with the above example, the receipt of the invoice by the second entity may enable the payment of the invoice, a request for a revision of the invoice, and/or a question regarding the invoice. Completion of the interaction involving the exchange of the invoice may also establish a relationship between the two entities, thus enabling further messaging and/or sharing of information between the entities outside the context of the invoice.

The model may continue to be updated, and interactions may continue to be enabled during use of the commerce network by the entities. In turn, the updates and interactions may increase the use of the commerce network by the entities and/or the value of the commerce network to the entities. For example, the model and commerce network may streamline a series of interactions across a set of entities in a supply chain and allow the entities to develop relationships and/or other insights among one another. In addition, the commerce network may include a generic endpoint that allows non-registered entities to easily interact with other entities through the commerce network, while providing opportunities for the non-registered entities to register with and/or join the commerce network.

Figure 10:
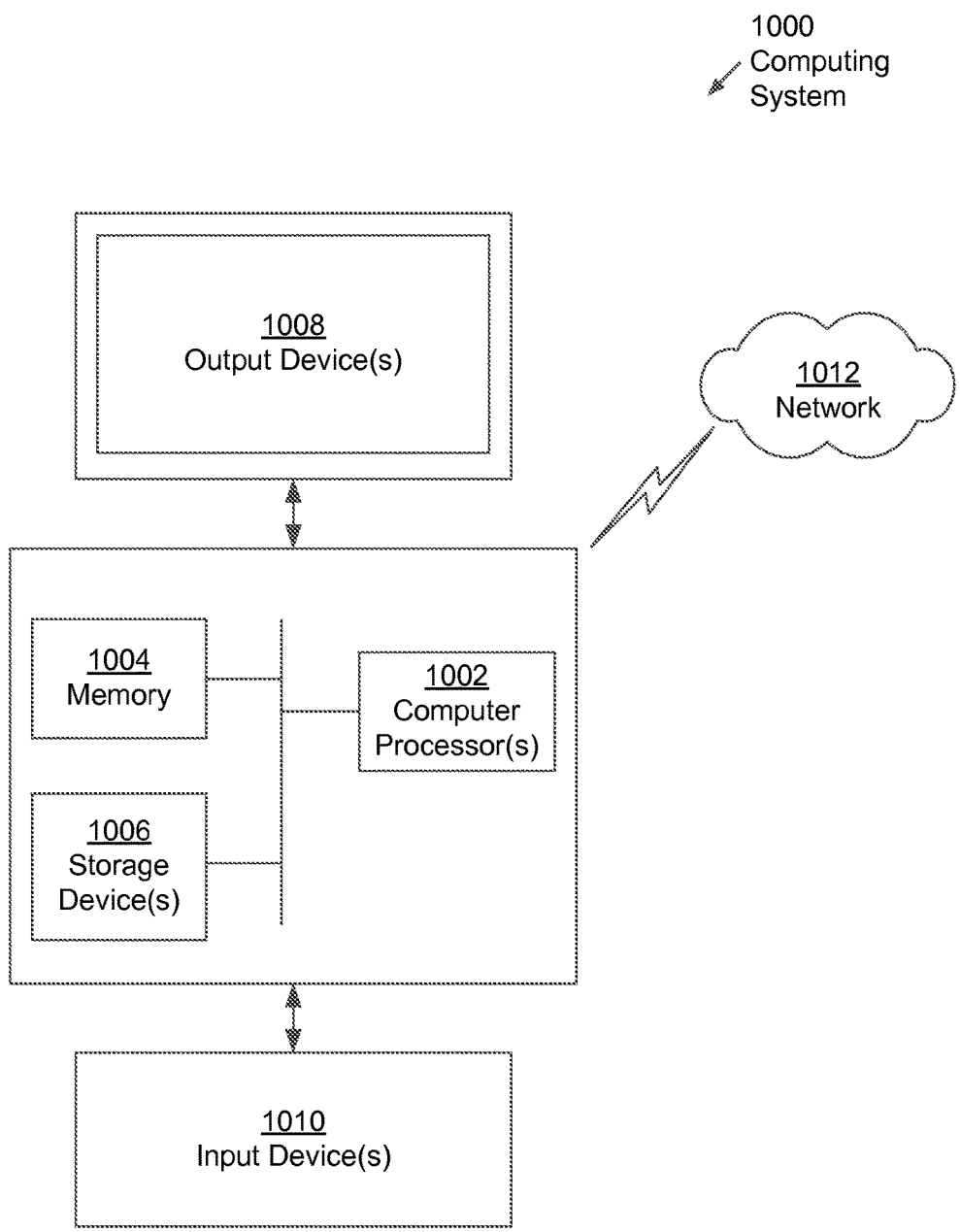
FIG. 10 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1000) may be located at a remote location and connected to the other elements over a network (1014). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transaction verification scoring comprising:
   receiving an artifact and an address of a non-registered entity associated with an interaction for a financial transaction within a commerce network, wherein the commerce network comprises:
     a first endpoint installed on a first distributed computing system of a plurality of distributed computing systems, the first endpoint accessible to a non-registered entity, and
     a second endpoint installed on a second distributed computing system of the plurality of distributed computing systems, the second endpoint accessible to a vendor registered within the commerce network, the interaction being conducted through the first endpoint and the second endpoint;
   sending a link to the artifact to the non-registered entity via the address of the non-registered entity;
   enabling, using the commerce network for the non-registered entity, access to an artifact associated with the interaction without requiring authentication of the non-registered entity,
     wherein enabling access is performed while maintaining access control to the artifact;
   accessing the artifact after enabling;
   completing, using the artifact, the financial transaction to create a single completed past financial transaction;
   obtaining, from a third distributed computing system of the plurality of distributed computing systems distributed throughout a computing network, a transaction description describing the single completed past financial transaction with a vendor;
   obtaining, from the plurality of distributed computing systems, a plurality of past transaction records of a plurality of potential corroborators;
   thereafter corroborating the single completed past financial transaction by using tracking data stored in the commerce network, and the plurality of past transaction records, to obtain at least two matching transaction records of at least two corroborators, in the plurality of potential corroborators,
     wherein each of the at least two matching transaction records corroborate the existence of the single completed past financial transaction;
   responsive to corroborating the single completed past financial transaction, scoring the transaction description based on a function of each of the at least two corroborators to the single completed past financial transaction to obtain a verification score, wherein the function defines a relationship between a corroborator in the at least two corroborators with respect to the single completed past financial transaction; and
   presenting, on a display device, a recommendation of the vendor to a consumer based on the verification score.

2. The method of claim 1, further comprising:
   ranking the vendor based, at least in part, on the verification score to obtain a ranking, wherein the recommendation is based on the ranking.

3. The method of claim 1, wherein reconciling the plurality of past transaction records comprising:
   identifying a submitter of the transaction description;
   obtaining, based on the transaction description, a unique identifier of the single completed past financial transaction, for the submitter; and
   matching the unique identifier to a matching transaction record in the at least two matching transaction records.

4. The method of claim 1, further comprising:
   obtaining a plurality of product types of a plurality of products offered by the vendor;
   combining, according to the plurality of product types transacted in each of a plurality of financial transactions, a plurality of verification scores of the plurality of financial transactions to obtain a composite product type verification score;
   receiving, from the consumer, an identification of a product in the plurality of products;
   selecting, from the plurality of product types, a product type of the product based on the identification;
   presenting, in the display device, the composite product type verification score for the product type to the consumer.

5. The method of claim 1, wherein the transaction description is a transaction record of the vendor.

6. The method of claim 1, wherein the transaction description is a customer review of the vendor.

7. The method of claim 1, wherein, when a corroborator in the at least two corroborators comprises a financial institution of a customer to the single completed past financial transaction, the verification score is greater than when the corroborator comprises a financial institution of the vendor to the single completed past financial transaction.

8. The method of claim 1, further comprising:
   obtaining a model of the commerce network comprising a set of entities, a set of relationships among the set of entities, a set of interactions related to commerce among the entities, and a set of activities associated with the set of entities, wherein the set of entities comprises the vendor;
   enabling, using the model, the single completed past financial transaction among two or more entities from the set of entities independently of a set of endpoints used by the entities to access the commerce network, wherein the set of endpoints comprises the first endpoint and the second endpoint; and
   storing the tracking data tracking the single completed past financial transaction,
   wherein reconciling the plurality of past transaction records comprises matching transaction records based on the tracking data.

9. A system for transaction verification scoring:
a computer processor;
a data repository operatively connected to the computer processor and for storing:
 a transaction description, and
 a verification score for the transaction description; and
a recommendation application, executing on the computer processor, operatively connected to the data repository and comprising:
 a management apparatus configured to:
  receive an artifact and an address of a non-registered entity associated with an interaction for a financial transaction within a commerce network, wherein the commerce network comprises:
   a first endpoint installed on a first distributed computing system of a plurality of distributed computing systems, the first endpoint accessible to a non-registered entity, and
   send a link to the artifact to the non-registered entity via the address of the non-registered entity, and
   a second endpoint installed on a second distributed computing system of the plurality of distributed computing systems, the second endpoint accessible to a vendor registered within the commerce network, the interaction being conducted through the first endpoint and the second endpoint,
  enable, using the commerce network for the non-registered entity, access to an artifact associated with the interaction without requiring authentication of the non-registered entity,
   wherein enabling access is performed while maintaining access control to the artifact;
  access the artifact after enabling; and
  complete, using the artifact, the financial transaction to create a single completed past financial transaction,
 a corroboration module configured to:
  obtain, from a third distributed computing system of the plurality of distributed computing systems distributed throughout a computing network, the transaction description describing the single completed past financial transaction with a vendor,
  obtain, from the plurality of distributed computing systems, a plurality of past transaction records of a plurality of potential corroborators, and
  thereafter corroborate the single completed past financial transaction by using tracking data stored in the commerce network, and the plurality of past transaction records, to obtain at least two matching transaction records of at least two corroborators, in the plurality of potential corroborators,
   wherein each of the at least two matching transaction records corroborate the existence of the single completed past financial transaction;
 a scoring module configured to score, responsive to corroborating the single completed past financial transaction, the transaction description based on a function of each of the at least two corroborators to the single completed past financial transaction to obtain a verification score, wherein the function defines a relationship between a corroborator in the at least two corroborators with respect to the single completed past financial transaction, and
 a user interface configured to present a recommendation of the vendor to a consumer based on the verification score.

10. The system of claim 9, wherein the ranking application further comprises:
 a ranking module configured to rank the vendor based, at least in part, on the verification score to obtain a ranking,
 wherein the recommendation is based on the ranking.

11. The system of claim 9,
 wherein the data repository further stores: a composite product type score, and
 wherein the recommendation application is further configured to:
  obtain a plurality of product types of a plurality of products offered by the vendor;
  combine, according to the plurality of product types transacted in each of a plurality of financial transactions, a plurality of verification scores of the plurality of financial transactions to obtain a composite product type verification score;
  receive, from the consumer, an identification of a product in the plurality of products;
  select, from the plurality of product types, a product type of the product based on the identification;
  present the composite product type verification score for the product type to the consumer.

12. The system of claim 9, further comprising:
 a modeling apparatus configured to provide a model of the commerce network comprising a set of entities, a set of relationships among the set of entities, a set of interactions related to commerce among the set of entities, and a set of activities associated with the entities, wherein the set of entities comprises the vendor,
 wherein the management apparatus is further configured to:
  use the model to enable the single completed past financial transaction among two or more entities from the set of entities independently of a set of endpoints used by the entities to access the commerce network, wherein the set of endpoints comprises the first endpoint and the second endpoint, and
  store the tracking data tracking the single completed past financial transaction,
 wherein reconciling the plurality of past transaction records comprises matching transaction records based on the tracking data.

13. The system of claim 9, wherein the plurality of potential corroborators comprises a customer, a financial institution of the vendor, and a financial institution of the customer.

14. The system of claim 9, wherein the data repository is further configured to store score configuration parameters, and wherein the user interface is configured to receive the score configuration parameters.

15. The system of claim 9, wherein the data repository is further configured to store a composite vendor score, and wherein the user interface is configured to display the composite vendor score.

16. A non-transitory computer readable medium comprising computer readable program code for:
 receiving an artifact and an address of a non-registered entity associated with an interaction for a financial transaction within a commerce network, wherein the commerce network comprises:
  a first endpoint installed on a first distributed computing system of a plurality of distributed computing systems, the first endpoint accessible to a non-registered entity, and a second endpoint installed on a second distributed computing system of the plurality of distributed computing systems, the second endpoint accessible to a vendor registered within the commerce network, the interaction being conducted through the first endpoint and the second endpoint;

sending a link to the artifact to the non-registered entity via the address of the non-registered entity;

enabling, using the commerce network for the non-registered entity, access to an artifact associated with the interaction without requiring authentication of the non-registered entity, wherein enabling access is performed while maintaining access control to the artifact;

accessing the artifact after enabling;

completing, using the artifact, the financial transaction to create a single completed past financial transaction;

obtaining, from a third distributed computing system of the plurality of distributed computing systems distributed throughout a computing network, a transaction description describing the single completed past financial transaction with a vendor;

obtaining, from the plurality of distributed computing systems, a plurality of past transaction records of a plurality of potential corroborators;

thereafter corroborating the single completed past financial transaction by using tracking data stored in the commerce network, and the plurality of past transaction records, to obtain at least two matching transaction records of at least two corroborators, in the plurality of potential corroborators, wherein each of the at least two matching transaction records corroborate the existence of the single completed past financial transaction;

responsive to corroborating the single completed past financial transaction, scoring the transaction description based on a function of each of the at least two corroborators to the single completed past financial transaction to obtain a verification score, wherein the function defines a relationship between a corroborator in the at least two corroborators with respect to the single completed past financial transaction;

presenting, on a display device, a recommendation of the vendor to a consumer based on the verification score.

17. The non-transitory computer readable medium of claim 16, wherein reconciling the plurality of past transaction records comprises:

identifying a submitter of the transaction description;

obtaining, based on the transaction description, a unique identifier of the single completed past financial transaction, for the submitter; and matching the unique identifier to a matching transaction record in the at least two matching transaction records.

18. The non-transitory computer readable medium of claim 16, further comprising computer readable program code for:

obtaining a plurality of product types of a plurality of products offered by the vendor;

combining, according to the plurality of product types transacted in each of a plurality of financial transactions, a plurality of verification scores of the plurality of financial transactions to obtain a composite product type verification score;

receiving, from the consumer, an identification of a product in the plurality of products;

selecting, from the plurality of product types, a product type of the product based on the identification;

presenting, in the display device, the composite product type verification score for the product type to the consumer.

19. The non-transitory computer readable medium of claim 16, wherein, when the at least one corroborator comprises a financial institution of a customer to the single completed past financial transaction, the verification score is greater than when the at least one corroborator comprises a financial institution of the vendor to the single completed past financial transaction.

20. The non-transitory computer readable medium of claim 16, further comprising computer readable program code for:

obtaining a model of a commerce network comprising a set of entities, a set of relationships among the set of entities, a set of interactions related to commerce among the set of entities, and a set of activities associated with the entities, wherein the set of entities comprises the vendor;

enabling, using the model, the single completed past financial transaction among two or more entities from the set of entities independently of a set of endpoints used by the entities to access the commerce network, wherein the set of endpoints comprises the first endpoint and the second endpoint; and storing the tracking data tracking the single completed past financial transaction, wherein reconciling the plurality of past transaction records comprises matching transaction records based on the tracking data.

\* \* \* \* \*